No. 850,563. PATENTED APR. 16, 1907.
G. A. BROWNE.
LUMBER TRUCK.
APPLICATION FILED DEC. 29, 1905.

2 SHEETS—SHEET 1.

WITNESSES

INVENTOR
GEORGE A. BROWNE
BY
HIS ATTORNEYS

No. 850,563. PATENTED APR. 16, 1907.
G. A. BROWNE.
LUMBER TRUCK.
APPLICATION FILED DEC. 29, 1905.

2 SHEETS—SHEET 2.

WITNESSES
INVENTOR
GEORGE A. BROWNE
BY
Paul & Paul
HIS ATTORNEYS

THE NORRIS PETERS CO., WASHINGTON, D. C.

UNITED STATES PATENT OFFICE.

GEORGE ALBERT BROWNE, OF TACOMA, WASHINGTON.

LUMBER-TRUCK.

No. 850,563.

Specification of Letters Patent.

Patented April 16, 1907.

Application filed December 29, 1905. Serial No. 293,734.

*To all whom it may concern:*

Be it known that I, GEORGE ALBERT BROWNE, of Tacoma, Pierce county, Washington, have invented certain new and useful Improvements in Lumber-Trucks, of which the following is a specification.

My invention relates to devices designed for use in raising lumber or heavy timbers for the purpose of loading or unloading them from a truck or other transporting means; and the object of my invention is to provide an apparatus of simple but strong and durable construction and one which can be easily operated and is very efficient for the purpose designed.

The invention consists generally in various constructions and combinations, all as hereinafter described, and particularly pointed out in the claims.

Figure 1:
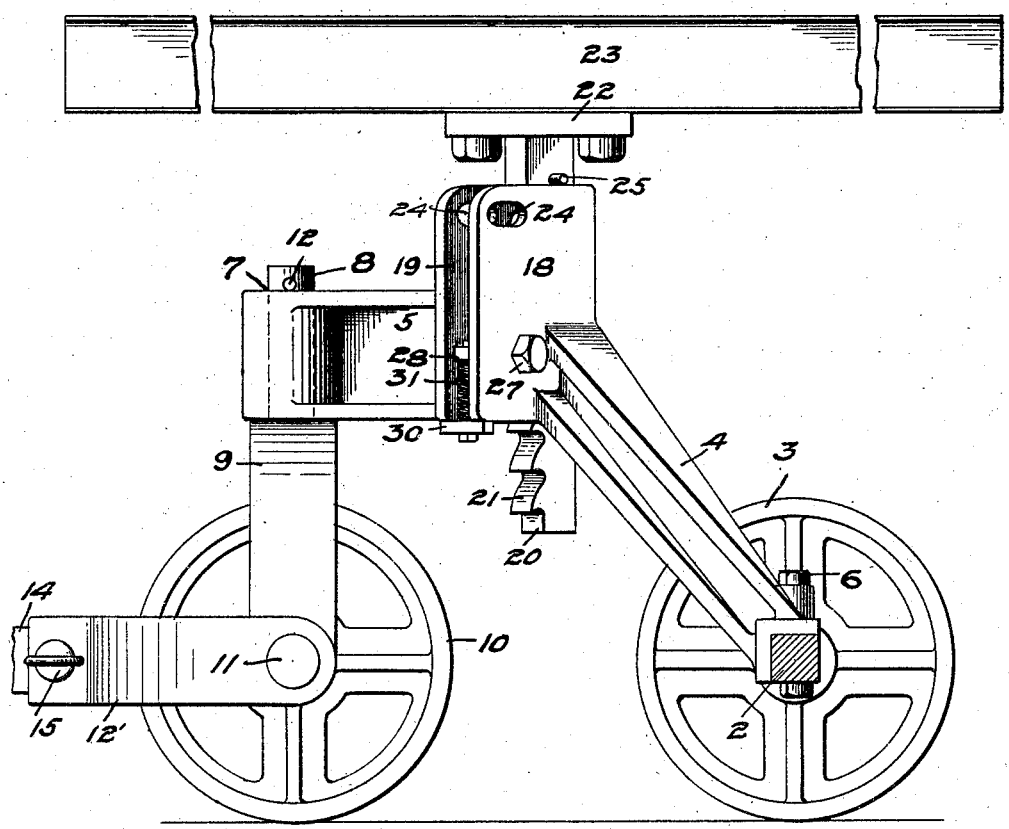
Figure 2:
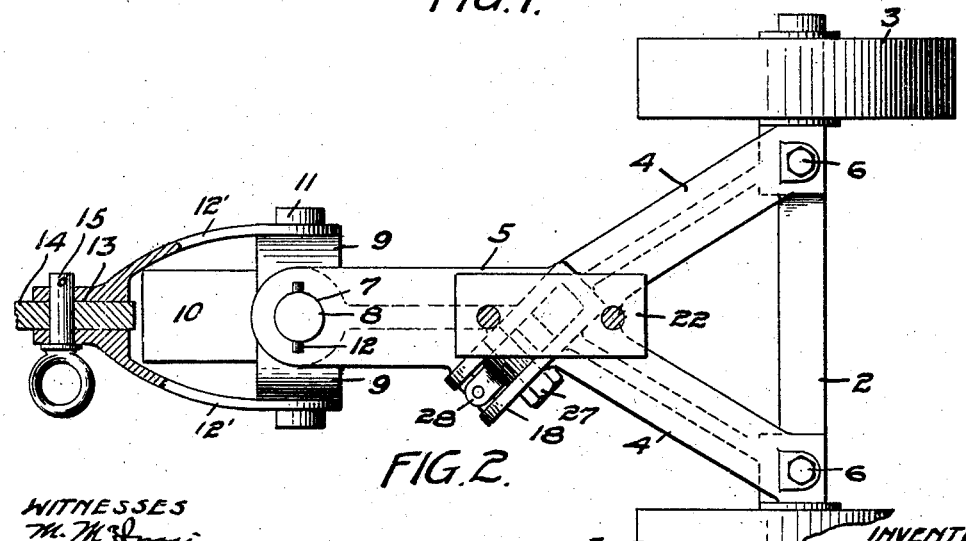
Figure 3:
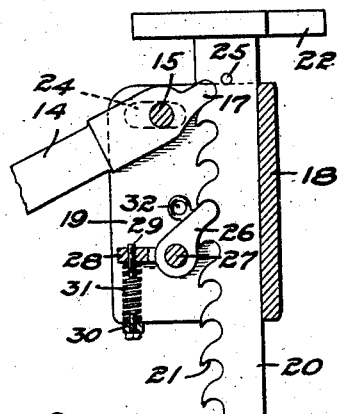
Figure 4:
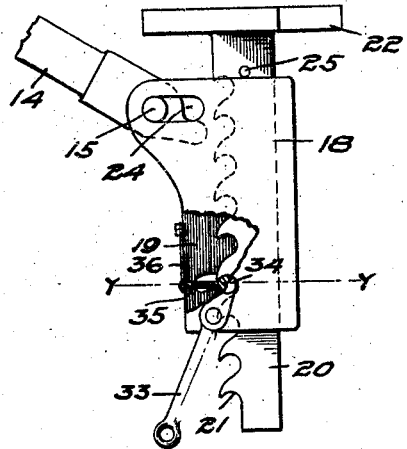
Figures 5, 6:
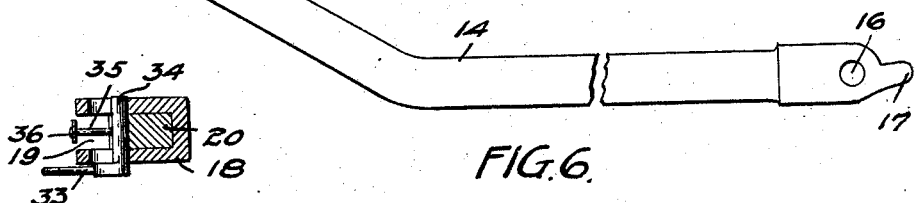
Figure 8:
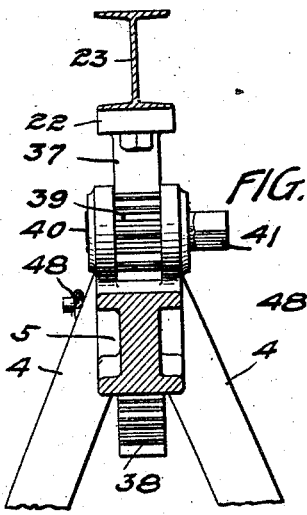
Figure 7:
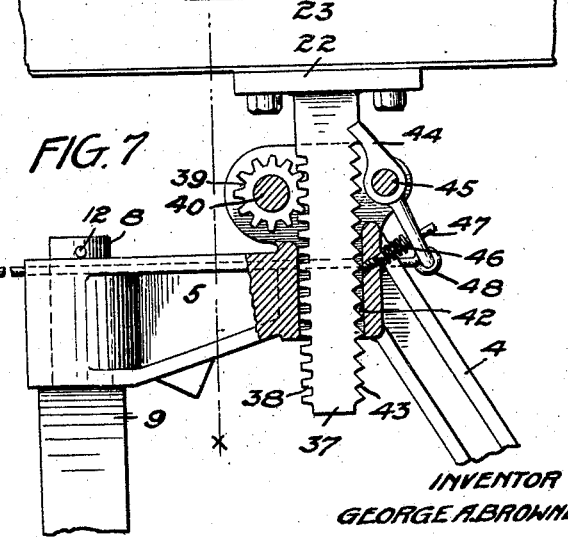

In the accompanying drawings, forming part of this specification, Figure 1 is a side elevation of a truck embodying my invention. Fig. 2 is a plan view of the same. Fig. 3 is a detail sectional view illustrating the mechanism employed for raising and locking the head block or beam which engages the bottom of the lumber. Fig. 4 is a similar view illustrating a modified construction of locking means. Fig. 5 is a sectional view on the line $y\ y$ of Fig. 4. Fig. 6 is a detail view of the lever used in elevating the head block or beam. Fig. 7 is a detail sectional view showing a rack-and-pinion mechanism employed as an elevating means. Fig. 8 is a vertical sectional view on the line $x\ x$ of Fig. 7.

In the drawings, 2 represents an axle having carrying wheels or blocks 3 and secured to the legs 4 of a frame 5 by bolts 6. The frame 5 has a vertical socket 7 to receive a stud 8, provided on the upper end of a fork 9, the lower end of which straddles a wheel 10 and is supported on the axle 11 thereof. The fork 9 has a swiveled bearing in the frame 5, and a pin 12 prevents the accidental separation of the stud 8 from its socket in said frame. A forked bail 12' is also mounted on the shaft 11, and is provided with a slot 13 to receive the end of a lever 14, which is pivotally secured in said slot by a pin 15. Said lever is preferably upwardly turned at one end and is provided at its opposite end with a hole 16 to receive the pin 15 and a toe 17, for the purpose hereinafter described. A housing 18 is preferably cast on said frame and the legs 4 and composed of plates vertically arranged and having a space 19 between them and open on one side and closed on the other. A bar 20, having a series of teeth 21 on one edge, is adapted to slide vertically in the space 19, being guided therein by the walls of the housing, and a block 22 is provided on the upper end of said bar, whereon an I-beam 23 is mounted. This I-beam is made of any suitable length and width and is adapted to bear on the bottom of the pile of lumber or timber for the purpose of elevating the same when the bar 20 is raised. The I-beam is arranged obliquely with respect to the rear axle or at right angles thereto, as indicated by the support of the beam in Fig. 2; but it may be mounted at any desired angle, according to the position where the truck is to be used.

In the upper part of the housing, near its open side, recesses 24 are formed to receive the pin 16, which forms a pivot for the lever 14 and supports it in position for the toe 17 to engage the teeth 21 for the purpose of raising the bar 20 and the I-beam supported thereon. The slots 24 are made of sufficient length to allow the lever to have a limited sliding movement in the housing toward and from the teeth of the bar 20. The lever is used both as a handle for drawing the truck and as a means for raising the bar 20 to lift the lumber. The lever is moved toward the inner end of the slot to allow its toe to engage the bar-teeth and is then drawn out and swung upwardly on its pivot to depress the said toe sufficiently to engage another tooth below the one with which it was in contact. A pin 25 limits the downward movement of the bar 20, and to lock the bar during each successive step of its upward movement I prefer to provide a dog 26, pivoted at 27 in the housing and having an arm 28 attached to a pin 29, between which and a lug 30 a spring 31 is arranged. A loop 32 is mounted on said dog, to which an operating cord or rod may be attached. The tension of the spring 31 tends to fold the dog in engagement with the teeth of the bar; but by pulling on the loop 32 the dog may be disengaged from the teeth and swung away from the same against the tension of the spring 31. In Fig. 4 I have shown a modification of this locking device, which consists in providing a lever 33, pivoted in said housing and having an arm 34 adapted to engage the teeth of the vertically-movable bar. A pin 35 is attached at one end to said arm and at the other to a flat spring 36, the tension of which is exerted to hold the arm in engagement with the bar-teeth. In Fig. 7 I have shown still another modification, which consists in providing a bar 37, having teeth 38 on one edge to engage a pinion 39, mounted on a shaft 40, having a squared end 41 for the reception of a wrench or other operating-tool. The bar 37 is vertically movable in a guideway 42 and is provided on the edge opposite the teeth 38 with a series of teeth 43, adapted to be engaged by a dog 44, pivoted at 45 and held in engagement with said teeth by a spring 46 on a pin 47. An operating-rod 48 is attached to the end of said dog and extends horizontally to a point within convenient reach of the operator of the machine.

By means of this apparatus a load of lumber can be easily and quickly raised off a truck or other support to allow the removal of the truck and its subsequent use for other loads and the insertion of wooden horses or other supporting means under the lumber to carry the same when the vertically-moving beam has been lowered to its normal position.

I claim as my invention—

1. The combination with a wheeled frame provided with a housing, of a toothed bar vertically movable in said housing, a beam carried by said bar and having a comparatively long horizontal bearing-surface adapted to engage the bottom of the lumber, means for lifting said bar step by step, and means for locking it, substantially as described.

2. A lumber-truck comprising a frame having carrying-wheels and a housing, a toothed bar vertically movable in said housing, a beam mounted on said bar and arranged at an angle to the truck-axle and having a horizontal upper surface adapted to engage the bottom of the lumber, a lever detachably mounted in said housing and adapted to engage said teeth to elevate said bar, and a locking-dog for said teeth, substantially as described.

3. A lumber-truck comprising a frame having carrying-wheels and a housing, a toothed bar vertically slidable in said housing, a beam mounted on said bar, a draft-handle for said frame, said handle being detachable from said frame and having a pivot that is slidable in slots provided in said housing, and the end of said handle being adapted to engage the teeth of said bar to elevate the same when said handle is depressed, and means for locking said bar during its upward movement, substantially as described.

4. A lumber-truck comprising a rear axle, a frame having legs supported on said axle, a fork swiveled on said frame, carrying-wheels mounted on said axle and in said fork, a bail connected to said fork, a draft-handle detachably connected with said bar, a toothed bar vertically movable in guides provided on said frame, a beam mounted on said bar, and said frame having slots near said bar wherein the detachable pivot of said handle is slidable toward and from said bar and whereby the end of said handle may be moved into or out of engagement with said teeth, and a spring-pressed dog arranged to engage said teeth and lock said bar in its raised position, substantially as described.

5. A lumber-truck comprising a three-wheeled frame having a housing thereon and a toothed bar vertically movable in said housing, a beam mounted on said bar and adapted to engage the bottom of the pile of lumber, a draft-handle pivotally and detachably connected to said frame, the pivot of said handle being slidable in slots provided in said housing near the teeth of said bar to allow the said handle to be moved toward or from said bar, and said handle having a toe to engage the teeth of said bar and whereby said bar and block will be raised with a step-by-step movement when said handle is depressed, and a spring-pressed dog for locking said bar in its raised position, substantially as described.

6. A lifting-truck comprising a frame having rearwardly-depending legs, an axle having carrying-wheels secured to said legs, a forward carrying-wheel swiveled on said frame, a housing provided on said frame, a bar vertically movable in said housing, a beam carried by said bar and adapted to engage the under side of the load, and means for raising said bar, substantially as described.

7. A truck comprising a frame having rearwardly-depending legs, a rear axle having carrying-wheels secured to said legs, a forward carrying-wheel swiveled on said frame, a housing provided on said frame, a toothed bar vertically movable in said housing, a beam carried by said bar and adapted to engage the under side of a load, a lever device having bearings in said housing for raising said bar step by step, and means for locking said bar.

8. A lifting-truck comprising a frame 5, having depending legs 4, a rear axle having carrying-wheels secured to said legs, a forward carrying-wheel swiveled in said frame, a housing provided in said frame, a toothed bar vertically movable in said housing, a beam carried by said bar and adapted to engage the under side of the load, means for raising said bar and means for locking it, substantially as described.

In witness whereof I have hereunto set my hand this 19th day of December, 1905.

GEORGE ALBERT BROWNE.

Witnesses:
J. W. BROWNE,
J. H. BOWLES.